United States Patent [19]

't Hoen

[11] Patent Number: 4,670,683
[45] Date of Patent: Jun. 2, 1987

[54] ELECTRONICALLY ADJUSTABLE MECHANICAL LENS FOR ULTRASONIC LINEAR ARRAY AND PHASED ARRAY IMAGING

[75] Inventor: Pieter 't Hoen, Mission Viejo, Calif.

[73] Assignee: North American Philips Corporation, New York, N.Y.

[21] Appl. No.: 767,403

[22] Filed: Aug. 20, 1985

[51] Int. Cl.⁴ .............................................. H01L 41/08
[52] U.S. Cl. ..................... 310/334; 310/335; 310/366
[58] Field of Search ............... 310/317, 335, 334, 366; 73/620, 625, 626, 628, 641, 642, 632; 128/660

[56] References Cited

U.S. PATENT DOCUMENTS

| | | | |
|---|---|---|---|
| 4,155,259 | 5/1979 | Engeler | 310/335 X |
| 4,211,949 | 7/1980 | Brisken et al. | 310/334 X |
| 4,217,516 | 8/1980 | Iinuma et al. | 310/335 |
| 4,242,912 | 1/1981 | Burckhardt et al. | 310/334 X |
| 4,326,418 | 4/1982 | Pell, Jr. | 310/322 X |
| 4,385,255 | 5/1983 | Yamaguchi et al. | 310/335 |
| 4,437,033 | 3/1984 | Diepers | 310/334 |
| 4,550,606 | 11/1985 | Drost | 310/334 |

*Primary Examiner*—Mark O. Budd
*Attorney, Agent, or Firm*—Jack E. Haken; James J. Cannon, Jr.

[57] ABSTRACT

An electronically adjustable mechanical lens for ultrasonic linear array and phased array imaging having strip-like electrodes in the longitudinal direction of the array. Electronic delays are applied to signals going to or coming from the electrodes in both the transverse plane and the longitudinal plane to correct for phase errors which would normally occur when the mechanical lens is out of focus. This results in increased depth of field for the transducer lens.

3 Claims, 8 Drawing Figures

1

ELECTRONICALLY ADJUSTABLE MECHANICAL LENS FOR ULTRASONIC LINEAR ARRAY AND PHASED ARRAY IMAGING

BACKGROUND OF THE INVENTION

1. Field of the Invention

This invention relates to ultrasonic transducers in general and more particularly to an ultrasonic transducer having an electronically adjustable mechanical lens permitting an increase in the depth of field for resolution perpendicular to the scanning direction of the transducer. The transducer may be either a linear array or a phased array.

2. Description of the Prior Art

The general characteristics of diagnostic ultrasound transducers are fairly well known in the prior art. Since the depth of field of present mechanical lenses is very limited, lenses have been proposed to image either close to or far from the scanned object, using two types of transducers for different applications. Alternatively, purely electronic solutions have been proposed. U.S. Pat. No. 4,371,805 discloses an ultrasonic transducer arrangement, the frequency of which is freely selectable within a certain range for the purpose of providing improved imaging conditions, particularly increased resolution in the production of images of a scanned space. This patent teaches an embodiment in which electronic focusing in the longitudinal direction as well in the transverse direction of the transducer should also be possible. The transducer uses a flat crystal without a mechanical lens. Consequently many acoustical lens elements are needed in the transverse direction. Thus, the major drawback of the transducer of this patent is the complex electronics required to make the design functional. British Pat. No. 1,514,050 is directed to an annular transducer arrangement with a fixed geometry rather than stepped electrodes. It uses a disc rather than a cylindrical lens and cannot be used in phased arrays.

U.S. Pat. No. 4,242,912 discloses a method for focusing an ultrasonic beam using time shifted pulsing of adjacent transducer elements, but not in conjunction with a prefocused mechanical lens.

SUMMARY OF THE INVENTION

In an ultrasonic imaging system, the performance of the transducer is significantly determined by the shape of the acoustic beam in both the direction of the scan (hereinafter the longitudinal direction) and normal to the scan (i.e., the elevation, hereinafter the transverse direction). The mechanical lens of linear arrays and phased arrays secures focusing in the direction perpendicular to the field of view. However, the mechanical lens is a fixed focus type of lens and hence provides a very limited depth of field. The present invention discloses an acoustic lens designed to improve the depth of field of the elevation focusing.

An extended depth of field in the elevation or transverse plane may be obtained by combining the mechanical lens and electronic focusing. To achieve this result one electrode of the piezoelectric slab is divided longitudinally in at least two places, as well as transversely. When piezoelectric material with low cross talk is used, scoring of the electrodes is sufficient. When the piezoelectric material has substantial cross talk, the piezoelectric material should be diced. Electronic delays are applied to the signals, transmitted from the middle longitudinal areas toward the scanned object and received from the scanned object by the electrodes, in order to correct for phase errors which would normally occur when the mechanical lens is out of focus. Only a few electrodes are needed when there is a mechanical prefocusing. Electronic focusing in the longitudinal direction is obtained by dividing the electrodes transversely. Switches are connected to each rectangular electrode. The signals are fed to and come from appropriate sets of delay circuits. This combination of electronic focusing in a mechanically prefocused transducer requires fewer elements and consequently fewer electronic components, while providing focusing properties and a depth of field in the transverse direction superior to that previously obtained, and may be used with both linear and phased arrays.

DESCRIPTION OF THE PREFERRED EMBODIMENT

Figure 1:
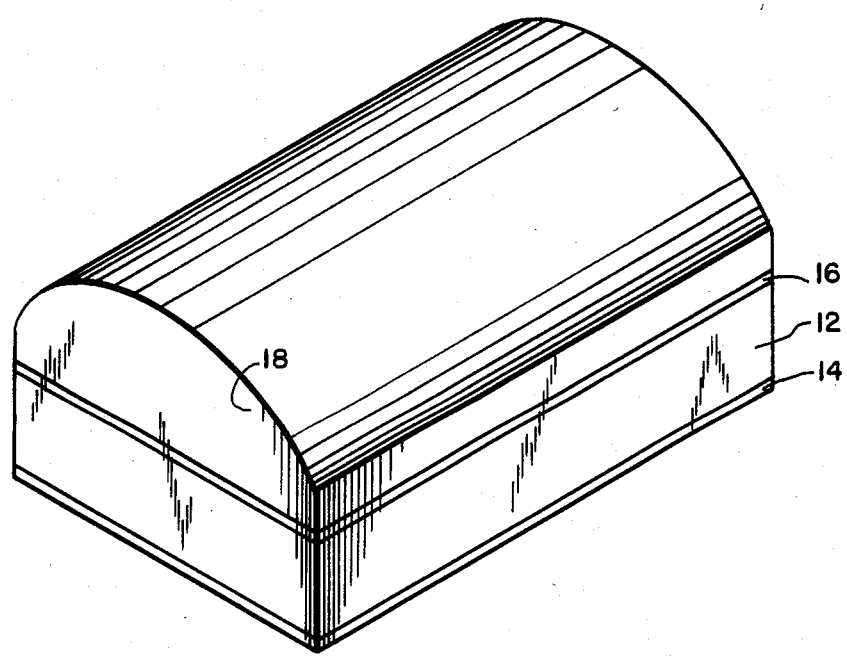
FIG. 1 is a perspective view of the electronically adjustable mechanical lens of the present invention.
Figure 2:
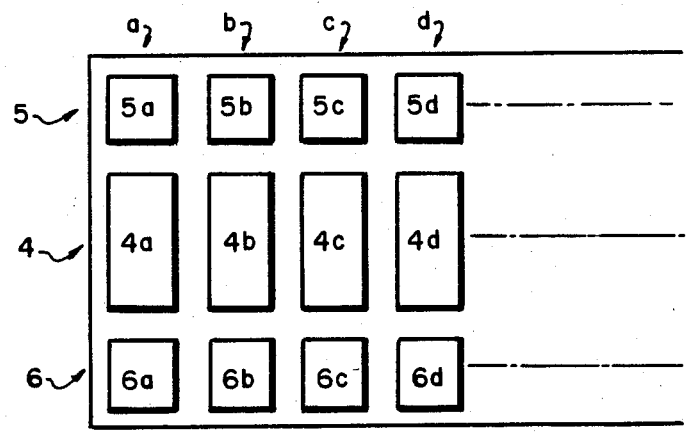
FIG. 2 is a plan view of the back face electrode of the electronically adjustable mechanical lens of FIG. 1.

Referring now specifically to FIG. 1, this figure illustrates an exaggerated perspective profile view of the electronically adjustable mechanical lens for ultrasonic linear array and phased array imaging of the present invention. This lens includes a piezoelectric crystalline material 12 in a strip form, an active electrode 14 on one side and a ground electrode on the other side 16. The mechanical lens 18 is placed over the ground electrode 16 such that the mechanical lens and the ground electrode are on the patient side of the transducer. Electronic focusing in the longitudinal direction is conventional, the active electrode 14 being divided transversely into segments (a, b, c, . . .), as illustrated in FIG. 2.

According to the invention, the back face active electrode 14 is also divided longitudinally into strips, preferably three strips, 4, 5 and 6. Thus divided, the mechanical lens of linear arrays and phased arrays can secure focusing in the transverse direction, perpendicular to the field of view. In this figure elements 4a, 4b, 4c, 4d, . . . on the back face of the piezoelectric electrode serve as the central electrodes and elements 5a, 5b, . . ., and 6a, 6b . . ., serve as the side electrodes. To obtain an extended depth of field in this plane, electronic delays are applied to the signals transmitted towards the scanned object and received from the scanned object by the central electrodes 4a, 4b, 4c, . . . in order to correct for phase errors which would normally occur when the mechanical lens is out of focus. This increase in the number of electrodes consequently requires additional switching electronics, though fewer components than used in the prior art. Since additional switching electronics are needed to contact the electrodes of the adjustable mechanical lens, it is preferable that the number of mechanical lens electrodes be limited to three, i.e., one central strip and two side strips. While better performance can be obtained with more than three electrodes in the transverse direction, the increase in switching elements may not be cost effective. The best focusing with a limited number of strips is obtained by minimizing the phase error per strip. Consequently, the width of the three strips is chosen such that the time-of-flight difference between the inner and the outer border of the side-strips equals the time-of-flight difference over the central strip. The time-of-flight differences are calculated for a certain focusing depth. For all practical purposes however, there is the same distribution of strips whatever the focusing depth or the radius of curvature of the mechanical lens.

The electronics (switches, multiplexers, etc.) may be in the scan head, resulting in reduced lead count in the cable; or the electronics may reside in the main frame, necessitating as many leads as acoustical elements in the cable.

Figure 3:
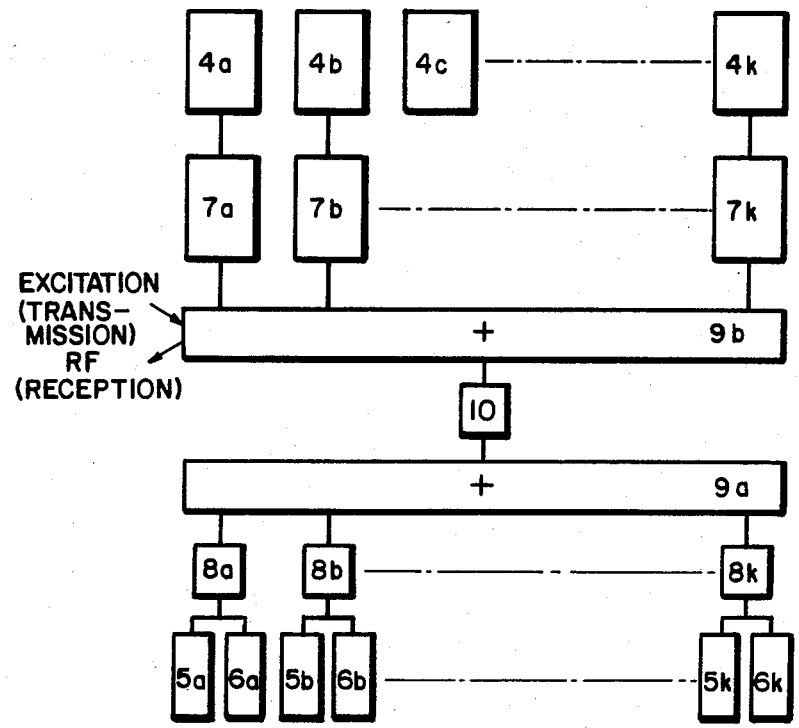
FIG. 3 is a block diagram of the electronic configuration for an electronically adjustable mechanical lens having an aperture of 16 elements longitudinally, and 3 elements transversely.

FIG. 3 is a block diagram of the basic electronic circuit configuration for the adjustable mechanical lens of the present invention having a 16 element aperture longitudinally. Elements 4a, 4b, 4c . . . 4k are acoustical elements under the electrodes having the same reference number. Elements 7a–7k and 8a–8k are delays to focus longitudinally. Elements 9a and 9b represent the summation of the received signals and element 10 represents a delay to adjust the timing in the transverse direction, which can be either a positive or a negative delay. When element 10 is dynamically varied, during reception of the echoes, the so-called tracking focusing can be obtained. Delays 8a, 8b . . . 8k are each connected to two elements 5a/6a, 5b/6b, etc. because the phase requirements of these grouped elements are the same. For FIG. 3 we have discussed so far focusing during reception. The same structure can also be used for transmission. This allows focusing transversely at any depth.

With reference to FIGS. 4 through 8, the electronically adjustable mechanical lens of the present invention is best understood by a discussion of the characteristics of a reference mechanical lens such as commonly used in the prior art transducers, and the effect of electronically focusing such a lens according to the present invention. All data will be given in millimeters, unless indicated otherwise.

The characteristics of the reference lens are as follows:
  mechanical radius of curvature: 50.0 mm, having an ultrasound propagation velocity of 1.0 mm per μs; hence, an ultrasonic radius of curvature equal to 100.0 mm;
  width: 15.0 mm;
  resonant frequency: 3.0 MHz, medium backing and one quarter wave adaptation layer, so a typical short impulse response results; and
  having double resonant-pulse excitation, that is, two short pulses half a wave long and one wave length apart. The aperture of the transducer consists of 16 elements with a pitch of 0.95 mm. The electronic focal length for focusing in the longitudinal direction is 80.0 mm.

Figure 4:
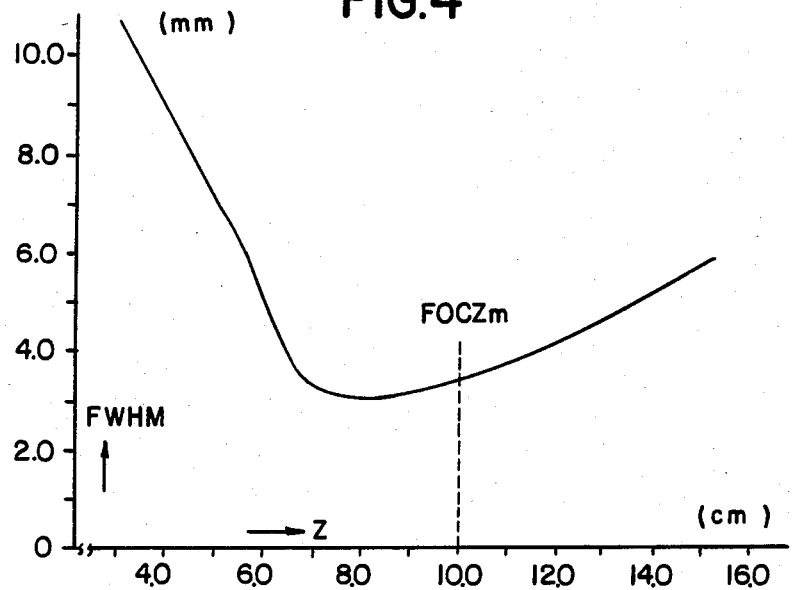
FIG. 4 is a graph of the resolution of the reference mechanical lens.

FIG. 4 shows the FWHM (Full Width at Half Maximum) of the main lobe of the directivity function of the mechanical lens, i.e. perpendicular to the image plane as a function of depth Z. The curve is characteristic in that:
  the best resolution is found at 80.0 mm; and that defocusing leads to poorer resolution at lesser and greater depths.

The purpose of the design of the lens of the present invention is to improve the resolution, both at closer range and further out. As an example we will analyse directivity at depth $Z=30.0$ mm and $Z=150.0$ mm. $FOCZ_m$ designates the natural ultrasonic radius of curvature of the mechanical lens. The value $FOCZ_m=100.0$ is indicated in FIG. 4. $FOCZ_1$ will mean the electronically adjusted focal length of the mechanical lens.

Depth 30.0 mm

Figure 6:
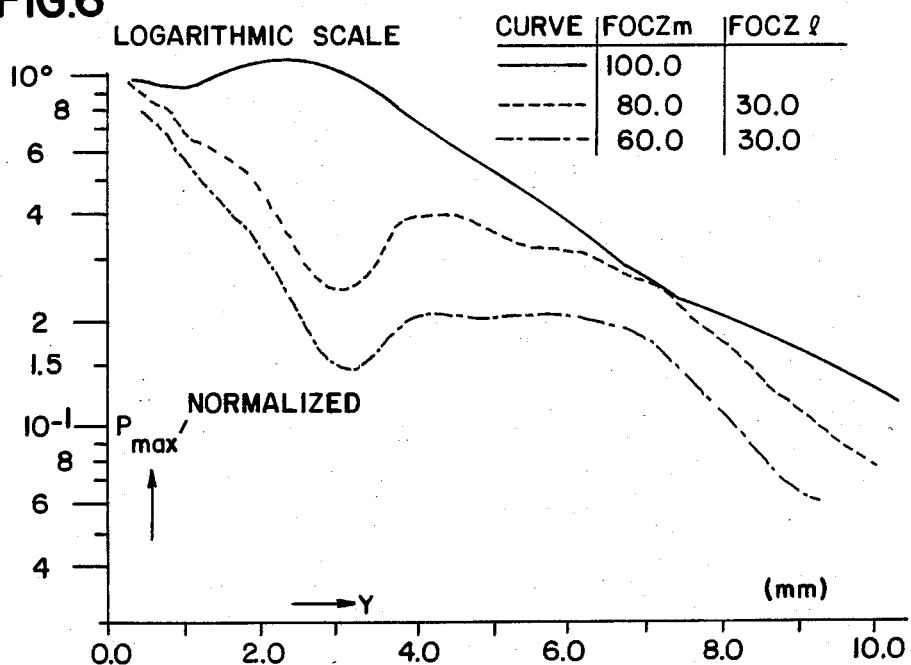
FIG. 6 is a graph showing the one way directivity function at $Z = 30.0$ mm.
Figure 7:
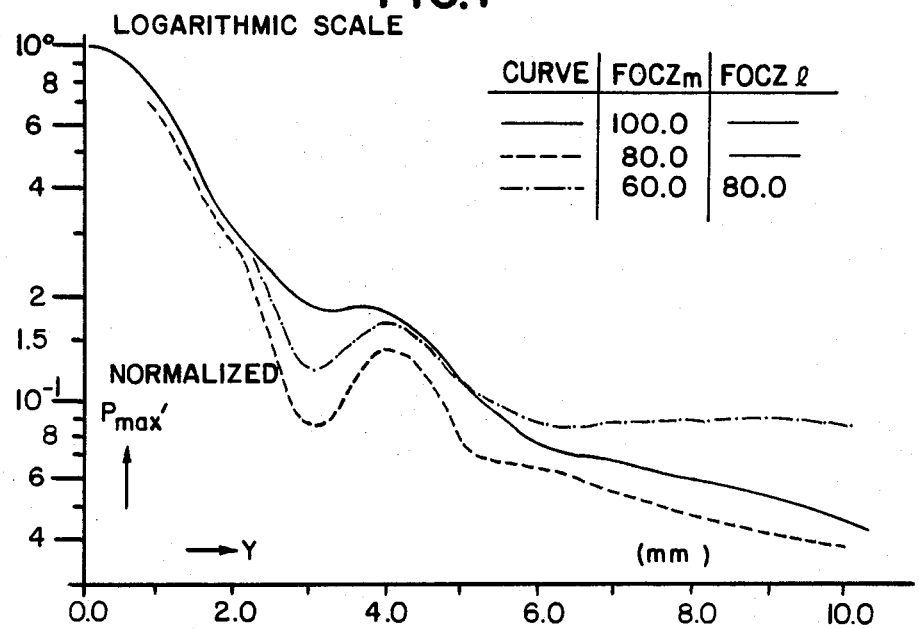
FIG. 7 is a graph showing the one way directivity functions at $Z = 80.0$ mm.

One way directivity functions at $Z=30.0$ mm are given in FIG. 6 (normalized maximum pressure as a function of transversal direction Y to beam axis).

The curve (FIG. 6) for no external focusing, $FOCZ_m=100.0$, shows the strong effect of defocusing at this distance. With $FOCZ_m=80.0$ or 60.0 mm, and $FOCZ_1=30.0$ mm, much better results are obtained. With $FOCZ_m=100.0$ and $FOCZ_1=30.0$, less gain would result. Apparently, in order to get good results at $Z=30.0$ mm, $FOCZ_m$ should be brought in closer than the original choice of $FOCZ_m=100.0$.

Depth 150.0 mm

Figure 5:
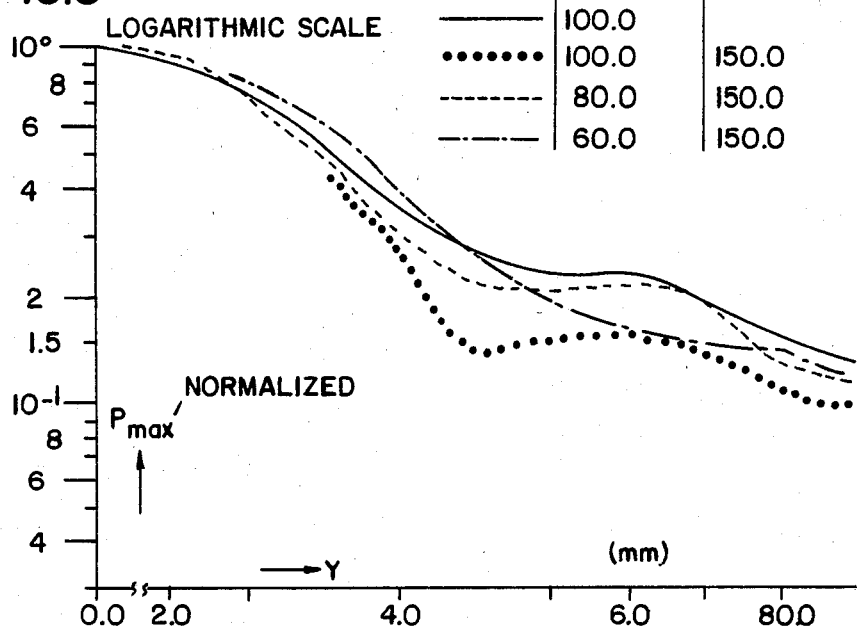
FIG. 5 is a graph showing the one way directivity function at $Z = 150.0$ mm.

One-way directivity functions at $Z=150.0$ mm are given in FIG. 5 (normalized maximum pressure as a function of transversal direction Y to beam axis). There is some gain in going to external focusing, with $FOCZ_m=100.0$. As has been shown above, the resolution can be improved considerably at $Z=30.0$ mm, provided that $FOCZ_m$ is chosen smaller. FIG. 5 now shows that comparable resolutions are obtained at $Z=150.0$ mm, when $FOCZ_m$ is reduced to 80.0 mm, or even to 60.0 mm.

Depth 80.0 mm

Equivalent resolutions (FIG. 7) are obtained for the following situations: $FOCZ_m=100.0$ mm/no external focusing, $FOCZ_m=80.0$ mm/no external focusing, and $FOCZ_m=60.0$ mm/$FOCZ_1=80.0$ mm. This is to be expected: the phase errors are small. So the choice of $FOCZ_m$ is not critical in the middle region of the image.

Conclusion

Figure 8:
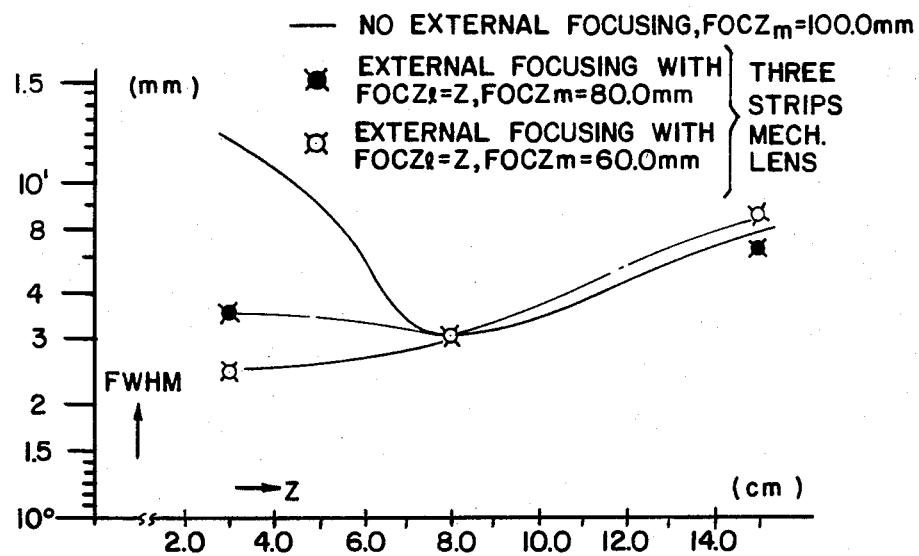
FIG. 8 is a graph showing the comparison of resolution at $Z = 30.0$, $80.0$ and $150.0$ mm.

Typical FWHM values are compared in FIG. 8. It can be seen that substantial gain in resolution is obtained at the smaller depths, with the active electrode divided up into three strips longitudinally, and the lens is focused electronically in the transverse plane according to the present invention.

What is claimed:

1. An electronically adjustable mechanical lens with focusing in the Y axis for linear array and phased array ultrasonic imaging, comprising:
  a transducer system comprising an elongated array of adjacent transducer elements formed from a piezoelectric ceramic having a metallized first major surface serving at a ground electrode and a metallized second major surface serving as an active electrode, wherein the thickness of said piezoelectric material is less than the width of a piezoelectric transducer element;

a plurality of adjacent active electrodes disposed on the active surface of said plate, the area of the plate underlying each of the electrodes defining a separate transducer element;

said active electrodes being formed by scoring the active surface transversely to form a first plurality of electrodes;

said active electrodes being further formed by scoring the active surface longitudinally in at least two places thereby dividing each electrode of said first plurality of electrodes into three electrodes, thereby forming a matrix having a columns of electrodes and at least three rows of electrodes, wherein the number of active electrodes in the Y direction is not less than three and not greater than five;

said at least three electrodes in one column comprising one central electrode and at least two side electrodes, the width of the at least three electrodes being such that the time of flight difference between the inner and outer border of the side electrodes is comparable to the time of flight difference over the central electrode, for all focusing depths concerned;

a convex cylindrical mechanical lens positioned over said ground electrode; and circuit means to pulse the transducer elements and circuit means to receive pulse echo signals such that a central electrode has a phasing delay with respect to its side electrodes coupled two-by-two, thereby compensating for the phase errors of a mechanical lens in the regions in which said mechanical lens is out of focus and providing for focusing in the Y axis.

2. An electronically adjustable mechanical lens with focusing in the Y axis for linear array and phased array ultrasonic imaging, comprising:

a plate of piezoelectric ceramic material having two opposed major surfaces;

a first conductive electrode serving as a ground electrode disposed on the first of said major opposed surfaces;

a second conductive electrode serving as an active electrode disposed on the second of said opposed major surfaces;

a convex cylindrical lens positioned over said first ground electrode surface;

said active electrode surface being subdivided into a plurality of active transducer electrodes, wherein the thickness of said piezoelectric material is less than the width of a piezoelectric transducer element, said surface being divided transversely into a plurality of columns by cutting through said electrode surface; and said surface being divided longitudinally by at least two cuts such that said each column has at least three electrode surfaces, one central electrode surface and at least two side electrode surfaces, wherein the number of active electrodes in the Y direction is not less than three and not greater than five;

said side electrode surfaces having one dimension in the longitudinal axis such that the time of flight difference between the inner and outer borders of the side electrodes is comparable to the time of flight difference over the central electrode surface, for all focusing depths concerned;

switching and circuit means to pulse the transducer elements under said electrode surfaces and to receive the pulse echoes returned to said transducer elements;

first delay means to focus said transducer elements longitudinally in the X axis by controlling the pulsing and receiving of said column electrodes;

second delay means to focus said transducer transversely by delaying the pulsing of each of said central electrode with respect to said side electrodes, there providing for focusing in the Y axis.

3. An electronically adjustable mechanical lens having focusing in the Y axis for linear array and phased array ultrasonic imaging, comprising:

a transducer system comprising an elongated array of adjacent transducer elements formed from a piezoelectric ceramic having a metallized first major surface serving as a ground electrode and a metallized second major surface serving as an active electrode, wherein the thickness of said piezoelectric material is less than the width of a piezoelectric transducer element;

a plurality of adjacent active electrodes disposed on the active surface of said plate, the area of the plate underlying each of the electrodes defining a separate transducer element;

said active electrodes being formed by dicing the active electrode and a portion of the piezoelectric ceramic under said electrode transversely to form a first plurality of electrodes;

said active electrodes being further formed by dicing the active electrode and a portion of the piezoelectric ceramic under said electrode longitudinally in at least two places thereby dividing each of said first plurality of electrodes into at least three electrodes, thereby forming a matrix having n columns of electrodes and at least three rows of electrodes, wherein the number of active electrodes in the Y direction is not less than three and not greater than five;

said at least three electrodes in one column comprising one central electrode and at least two side electrodes, the width of the at least three electrodes being such that the time of flight difference between the inner and outer border of the side electrodes is comparable to the time of flgiht difference over the central electrode, for all focusing depths concerned;

a convex cylinderical mechanical lens positioned over said ground electrode; and circuit means to pulse said transducer elements for transmission and to receive pulse echo signals such that each of said central electrodes has a phasing delay with respect to its adjacent side electrodes coupled two-by-two, thereby proving focusing in the Y axis to compensate for phase errors of a mechanical lens in regions in which said mechanical lens is out of focus.

* * * * *